United States Patent
Chen et al.

(10) Patent No.: US 7,515,940 B2
(45) Date of Patent: Apr. 7, 2009

(54) NODE DEPENDENT WIRELESS TRANSMIT ANTENNA SELECTION TECHNIQUE

(75) Inventors: Ming Chi Chen, Union City, CA (US); Mickey Ramal Henniger, Buchanan Dam, TX (US)

(73) Assignee: Cisco Technology, Inc., San Jose, CA (US)

( * ) Notice: Subject to any disclaimer, the term of this patent is extended or adjusted under 35 U.S.C. 154(b) by 716 days.

(21) Appl. No.: 11/086,489

(22) Filed: Mar. 22, 2005

(65) Prior Publication Data
US 2006/0217128 A1 Sep. 28, 2006

(51) Int. Cl.
*H04M 1/00* (2006.01)
(52) U.S. Cl. .................. 455/562.1; 455/101; 375/299
(58) Field of Classification Search .......... 455/500, 455/501, 504–506, 101, 103, 562.1; 375/299; 342/373–374, 359
See application file for complete search history.

(56) References Cited

U.S. PATENT DOCUMENTS

| | | | | |
|---|---|---|---|---|
| 5,095,535 | A * | 3/1992 | Freeburg | 455/278.1 |
| 6,281,840 | B1 * | 8/2001 | Miyoshi et al. | 342/374 |
| 2004/0255016 | A1 * | 12/2004 | Hundscheidt et al. | 709/223 |
| 2005/0009475 | A1 * | 1/2005 | Hwang | 455/100 |

OTHER PUBLICATIONS

Moon, Jaekyun and Kim, Younggyun, Antenna Diversity Strengthens Wireless Lans, Jan. 2003 Communication Systems Design, pp. 15-22, www.CommsDesign.com.

* cited by examiner

*Primary Examiner*—Edward Urban
*Assistant Examiner*—Raymond S Dean
(74) *Attorney, Agent, or Firm*—Charles E. Krueger

(57) ABSTRACT

A system and method for selecting a best transmit antenna for a transceiver using antenna diversity that caches the identity of the best transmit antenna for each remote node from which a message has been received. The best transmit antenna is then selected for each message sent to a remote node having a cache entry.

9 Claims, 4 Drawing Sheets

NODE DEPENDENT WIRELESS TRANSMIT ANTENNA SELECTION TECHNIQUE

BACKGROUND OF THE INVENTION

Antenna diversity has long been utilized in wireless communication systems and is currently being deployed in handheld devices such as cellular telephones.

Many RF Transmitter/receiver systems contain antenna systems which have multiple antennas. The multiple "diversity" antennas are physically separated with the intent that each antenna has a unique coverage pattern.

When an RF transmission is sent to the diversity antenna system, the RF receiver antenna control hardware dynamically determines which antenna contains the best/strongest signal and electrically connects the best antenna to the radio receiver hardware. This dynamic selection can (and usually does) occur independently on each packet/message received on the diversity antenna system.

When selecting a transmit antenna the following assumptions are made:

1. The receive coverage pattern is similar to the transmit coverage pattern for a given antenna in a multiple antenna system, and
2. Adjacent packets in time (e.g., just before or just after one another) tend to be going to or coming from the same far-end node The transmit antenna selection algorithm for the diversity antenna system is to use the same antenna which was last selected as the best receive antenna on the most recently received RF packet/message.

However, in many cases one or both of the above-stated assumptions are not valid. In those cases existing systems could select the antenna with the weaker signal response when transmitting to a node.

Accordingly, devices that could take advantage of the availability of multiple antennas during transmission would provide substantial improvement in device performance.

BRIEF SUMMARY OF THE INVENTION

In one embodiment of the invention, the antenna which was used to receive a packet for each node is remembered and then later when sending a packet to that same node, the same antenna that was used to receive the packet from that node is used to transmit a packet to that node.

In another embodiment of the invention, the best antenna for each node is determined by messages from a remote node to the transceiver indicating the signal quality of received messages from the transceiver.

In another embodiment of the invention, best antenna indications for each node from which a message is received are cached. Cache entries are refreshed after a timeout period.

In another embodiment of the invention, the timeout period for remote nodes that do not change best antennas for a set period of time have their timeout periods extended.

Other features and advantages of the invention will be apparent in view of the following detailed description and appended figures.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

Figure 1:
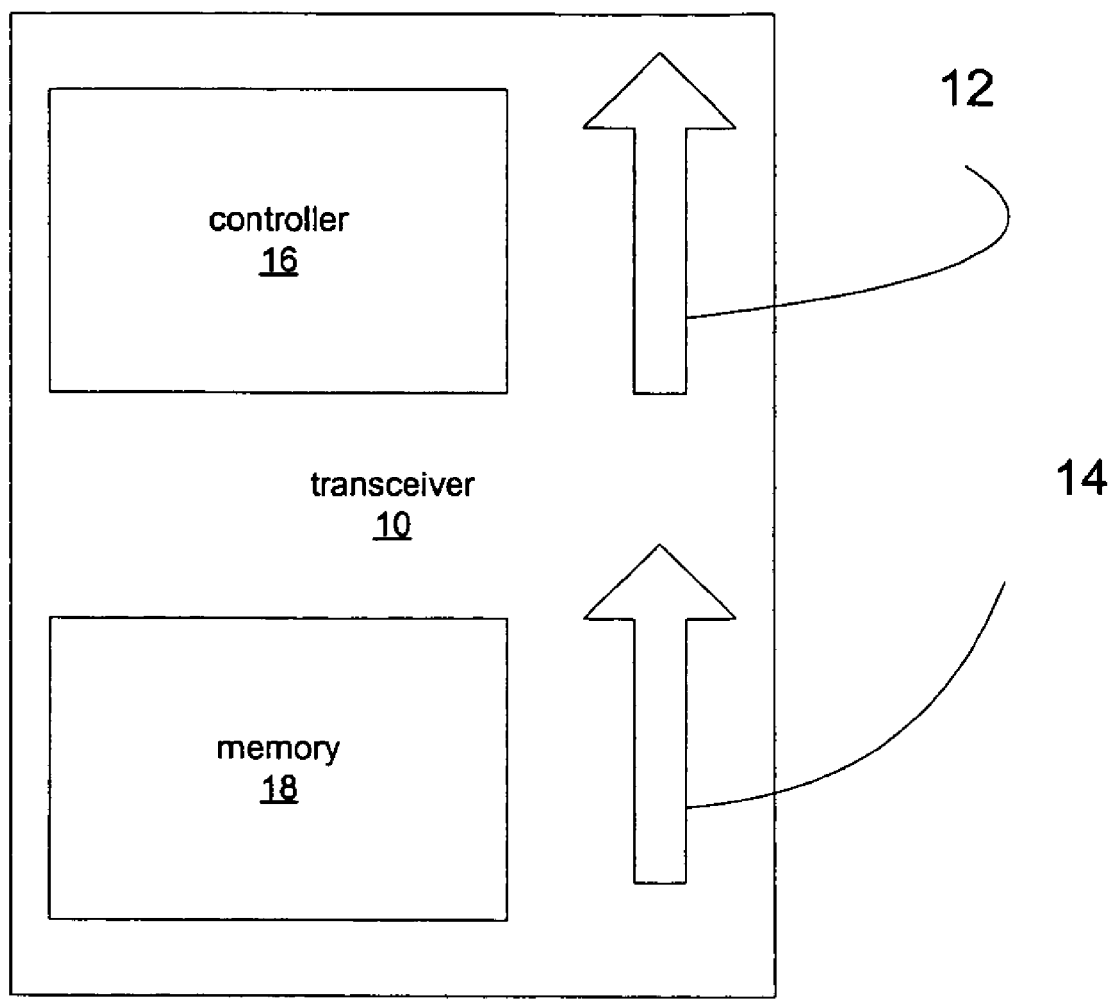
FIG. 1 is a block diagram of a transceiver having two antennas used for antenna diversity.

Various embodiments of the invention will now be described with reference to FIG. 1 which depicts a wireless transceiver 10 having first and second antennas 12 and 14, a controller 16, and a memory 18. More than two antennas can be utilized but are not necessary to describe the operation of the embodiments.

As described above, the controller executes code or includes hardware to measure the received signal strength at both antennas of a signal being transmitted by a particular node and selects the antenna having highest received signal strength.

In the following embodiments the above listed assumptions are addressed and therefore do not need to be made. These embodiments allow a per-node selection of the best antenna for a given remote node. This means the best diversity transmit antenna is used more often than in previous systems and results in better signal strength and quality in the local-node transmit path.

A first embodiment of the invention will now be described with reference to the flow charts of FIGS. 2 and 3.

Figure 2:
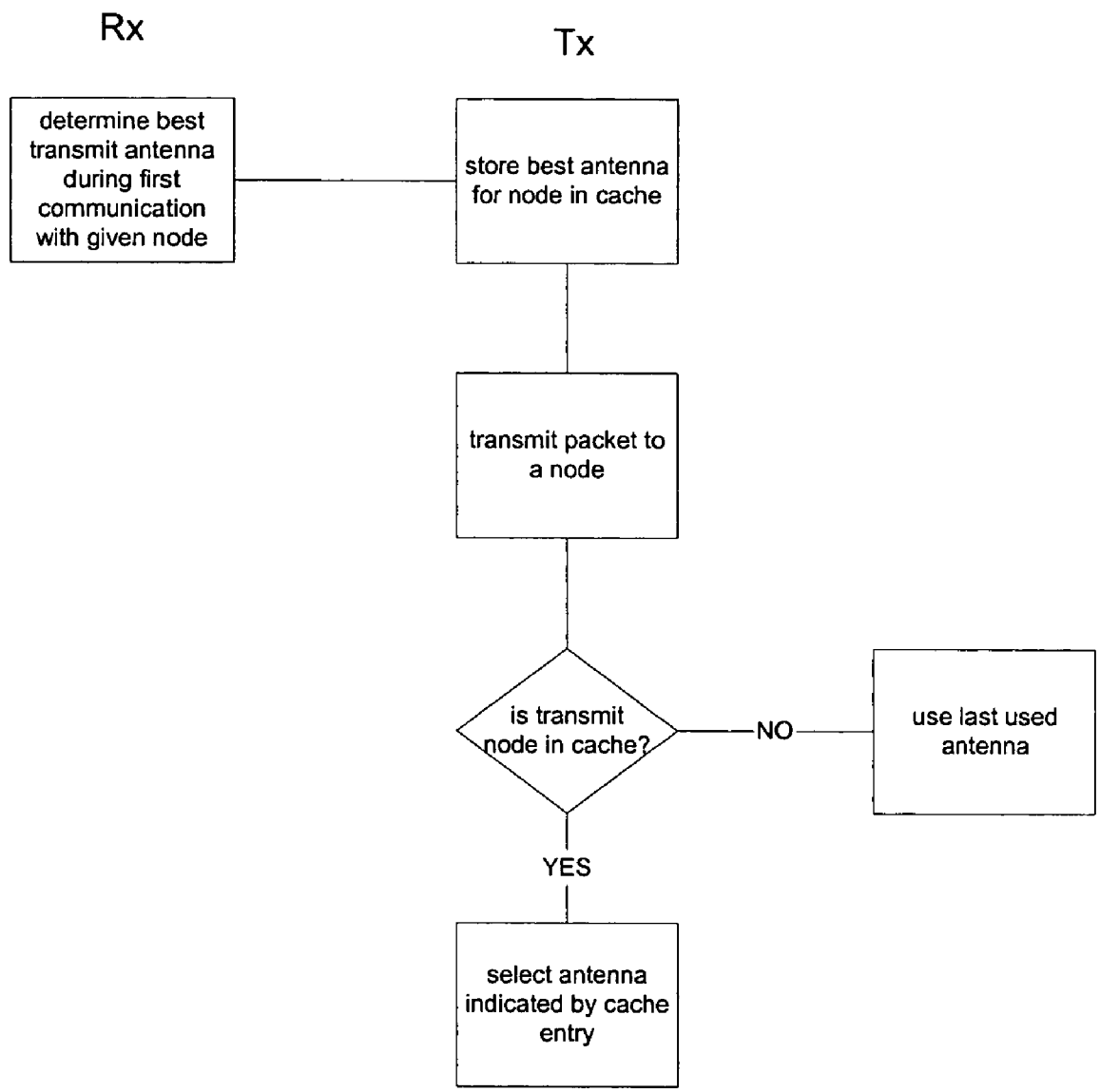
FIGS. 2-4 are flowcharts depicting the operation of embodiments of the invention.
Figure 3:
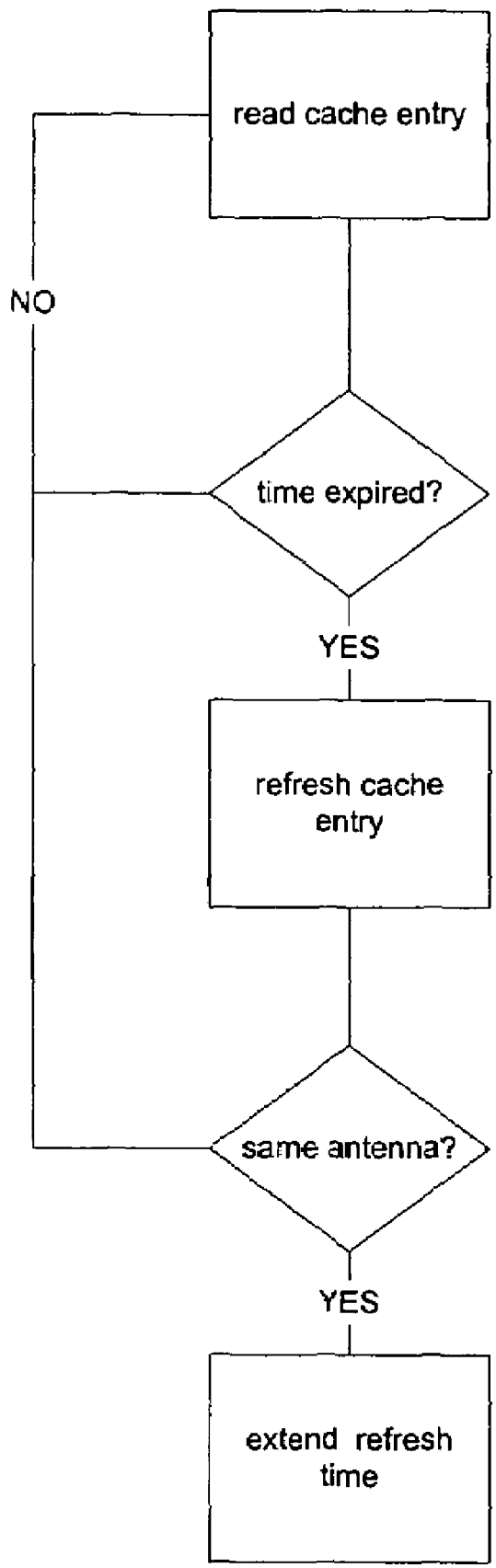

Referring to FIG. 2, the best transmit antenna is determined during the first communication with a given node is determined and periodically thereafter when receive signal strength quality measurements are made as the local station transmits on each of the antennas. The best transmit antenna for this particular node is then stored in a local database/cache.

When a packet/message is to be transmitted to any given node, the local database/cache is referenced to determine the best transmit antenna to use for the particular node to which the packet is destined. Thus, for each packet the node is determined and the best transmit antenna is selected.

The cached elements can optionally be aged. As depicted in FIG. 3, if the timeout period has expired a new assessment of the best transmit antenna is made, thereby refreshing the cache entry.

If a given node usually refreshes to the same antenna, then the timeout age on the cache entry can be extended. In this way, static (non-moving) nodes will spend less and less time determining which antenna to use. Conversely, if the "best" antenna changes often, then the cache element age timeout should be decreased.

Figure 4:
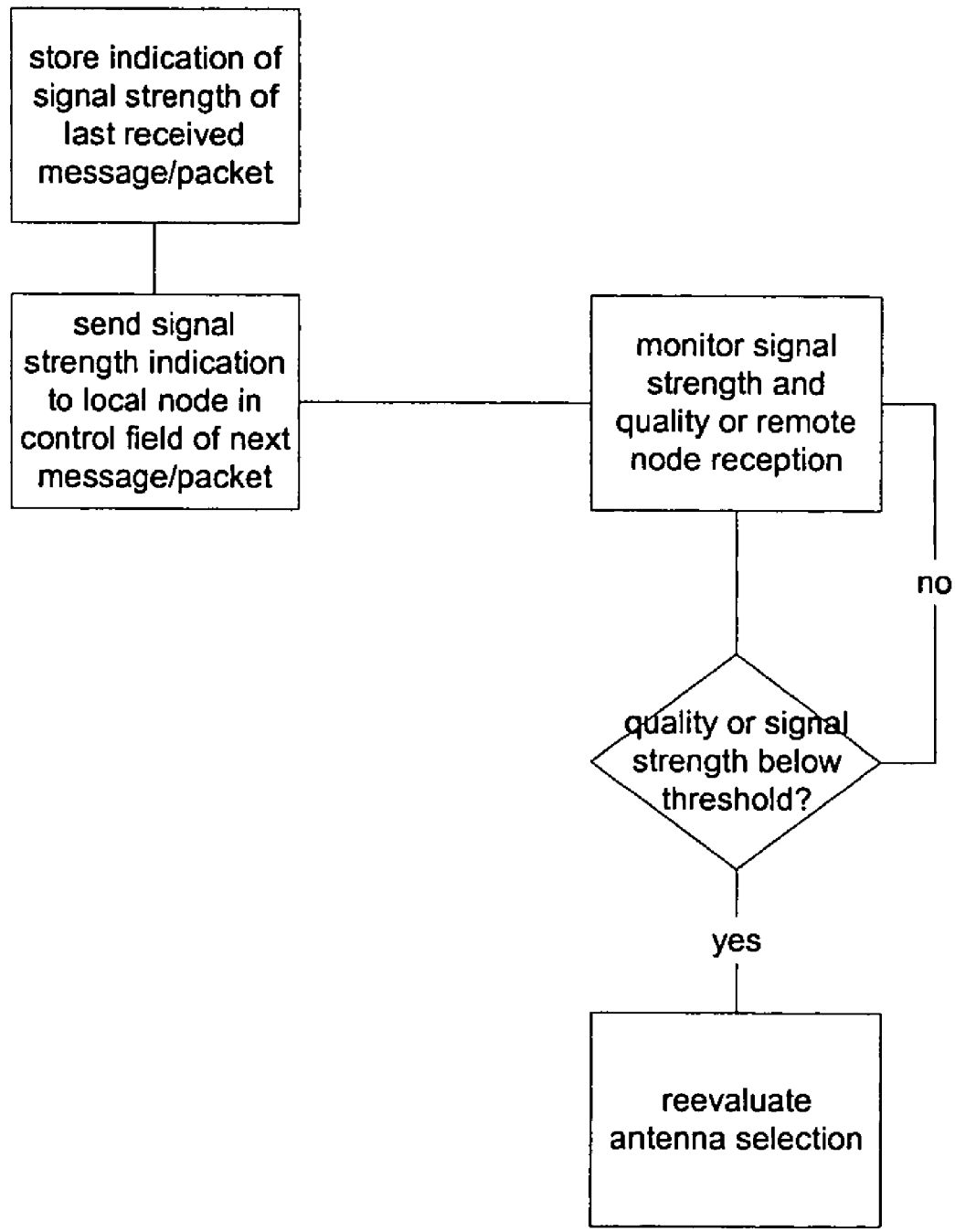

A second embodiment will now be described with reference to FIG. 4. This embodiment is similar to the first embodiment, except that the remote node remembers the signal strength and quality of its last received packet/message and sends that to the local unit on the next remote-node-to-local-node packet/message, as part of the control information/header.

In this way, the local node can continuously monitor received signal strength and the quality of remote nodes' reception of frames sent by the local node.

When signal strength/quality drops below identified thresholds, re-evaluation of the best antenna to use can happen immediately.

In a third embodiment, the assumption is made that the transmit and receiver coverage for a given antenna and a given receiver are effectively the same.

This means that the local node's receive signal strength and quality of messages received from a remote node are assumed to be the same signal strength and quality of the messages received by the remote node.

In this embodiment, on the receipt of any message, the best receive diversity antenna used to receive the packet is held in a database entry for that node.

The next transmission to that node references the database to determine the best receive antenna for that node, and therefore assumes it is also the best transmit antenna to use.

The invention has now been described with reference to the preferred embodiments. Alternatives and substitutions will now be apparent to persons of skill in the art. Accordingly, it is not intended to limit the invention except as provided by the appended claims.

What is claimed is:

1. A method comprising:
   storing an indication of a best transmit antenna in a diversity antenna transceiver for each remote node from which a message has been received by forming a cache entry associating the best antenna with the remote node;
   refreshing a cache entry if a timeout period has expired;
   extending the timeout period for a cache entry when the remote node usually refreshes to the same best antenna;
   examining a message to be transmitted to determine the target remote node which is the destination of the message; and
   utilizing the best antenna indicated for the remote node if an indication of the best antenna for the remote node has been previously stored.

2. The method of claim 1 further comprising the step of:
   determining the best transmit antenna for a remote node during a first communication with the remote node.

3. The method of claim 1 further comprising the step of:
   storing a signal quality indication of received signal quality at the remote node for each message received from the transceiver; and
   sending the quality indication to the transceiver as control information in the next message transmitted to the transceiver.

4. A system comprising:
   means for storing an indication of a best transmit antenna in a diversity antenna transceiver for each remote node from which a message has been received by forming a cache entry associating the best antenna with the remote node;
   means for refreshing a cache entry if a timeout period has expired;
   means for extending the timeout period for a cache entry when the remote node usually refreshes to the same best antenna;
   means for examining a message to be transmitted to determine the target remote node which is the destination of the message; and
   means for utilizing the best antenna indicated for the remote node if an indication of the best antenna for the remote node has been previously stored.

5. The system of claim 4 further comprising:
   means for determining the best transmit antenna for a remote node during a first communication with the remote node.

6. The system of claim 4 further comprising:
   means for storing a signal quality indication of received signal quality at the remote node for each message received from the transceiver; and
   means for sending the quality indication to the transceiver as control information in the next message transmitted to the transceiver.

7. An apparatus comprising:
   a memory including a cache portion and a portion for storing program code;
   a plurality of diversity antennas;
   a processor coupled to read and write data to the memory and coupled to control the antennas, with the processor configured to execute program code to store an indication of a best transmit antenna in a diversity antenna transceiver for each remote node from which a message has been received by forming a cache entry associating the best antenna with the remote node, to refresh a cache entry if a timeout period has expired, to extend the timeout period for a cache entry when the remote node usually refreshes to the same best antenna, to examine a message to be transmitted to determine the target remote node which is the destination of the message, and to utilize the best antenna indicated for the remote node if an indication of the best antenna for the remote node has been previously stored.

8. The apparatus of claim 7 with the processor further configured to:
   determine the best transmit antenna for a remote node during a first communication with the remote node.

9. The apparatus of claim 7 with the processor further configured to:
   store a signal quality indication of received signal quality at the remote node for each message received from the transceiver; and
   send the quality indication to the transceiver as control information in the next message transmitted to the transceiver.

* * * * *